United States Patent [19]
Sakurai et al.

[11] Patent Number: 6,060,699
[45] Date of Patent: May 9, 2000

[54] ELECTRODE STRUCTURE FOR HIGH TEMPERATURE HEATED BODY

[75] Inventors: Kazuhiro Sakurai, Gotenba; Hiroshi Hosokawa, Kumagaya, both of Japan

[73] Assignee: Toyota Jidosha Kabushiki Kaisha, Aichi-Ken, Japan

[21] Appl. No.: 08/855,420

[22] Filed: May 13, 1997

[30] Foreign Application Priority Data

May 14, 1996 [JP] Japan .................................... 8-119220

[51] Int. Cl.[7] ........................................................ H05B 3/68
[52] U.S. Cl. .......................... 219/541; 219/205; 219/542
[58] Field of Search .................................. 219/541, 206, 219/205, 207, 208; 392/354, 384, 386; 439/886

[56] References Cited

U.S. PATENT DOCUMENTS

| | | | |
|---|---|---|---|
| 5,053,603 | 10/1991 | Wagner .................................... | 219/205 |
| 5,238,650 | 8/1993 | Sheller et al. . | |
| 5,318,756 | 6/1994 | Sheller et al. . | |
| 5,459,748 | 10/1995 | Gleichman et al. .................... | 373/132 |
| 5,614,120 | 3/1997 | Wenzel .................................... | 219/541 |
| 5,618,462 | 4/1997 | Swars ...................................... | 219/541 |
| 5,626,785 | 5/1997 | Rajnik .................................... | 219/541 |

FOREIGN PATENT DOCUMENTS

| | | |
|---|---|---|
| 0504868 | 7/1994 | European Pat. Off. . |
| 0669453 | 8/1995 | European Pat. Off. . |
| 9205259 | 8/1992 | Germany . |
| 4435784 | 4/1996 | Germany . |
| 51-42145 | 4/1976 | Japan . |
| 6-108831 | 4/1994 | Japan . |

OTHER PUBLICATIONS

MTZ (Motortechnische Zeitscrift); 56. Jahrgang/Nr. 4. pp. 228 to 232.

Copending U.S. Patent Application Serial No. 08/392,306, filed Feb. 22, 1995, and its divisional application now pending.

*Primary Examiner*—Teresa Walberg
*Assistant Examiner*—Thor Campbell
*Attorney, Agent, or Firm*—Kenyon &n Kenyon

[57] ABSTRACT

An electrode for connecting an external electric wire to a body heated to a high temperature includes a high temperature side electrode made of a conductor connected to the heated body, and a low temperature side electrode connected at a first end thereof to the high temperature side electrode and at a second end thereof to the external electric wire. The low temperature side electrode is formed of a conductor covered by an insulating material with the conductor of the low temperature side electrode being made of a material having a conduction resistance smaller than that of the conductor of the high temperature side electrode. Thus, as the conductor of the low temperature side electrode has a smaller conduction resistance than the conductor of the high temperature side electrode, an increase in a resistance value is reduced even when the conductor of the low temperature side electrode is extended to lower the temperature at a connection to an external electric wire.

12 Claims, 3 Drawing Sheets

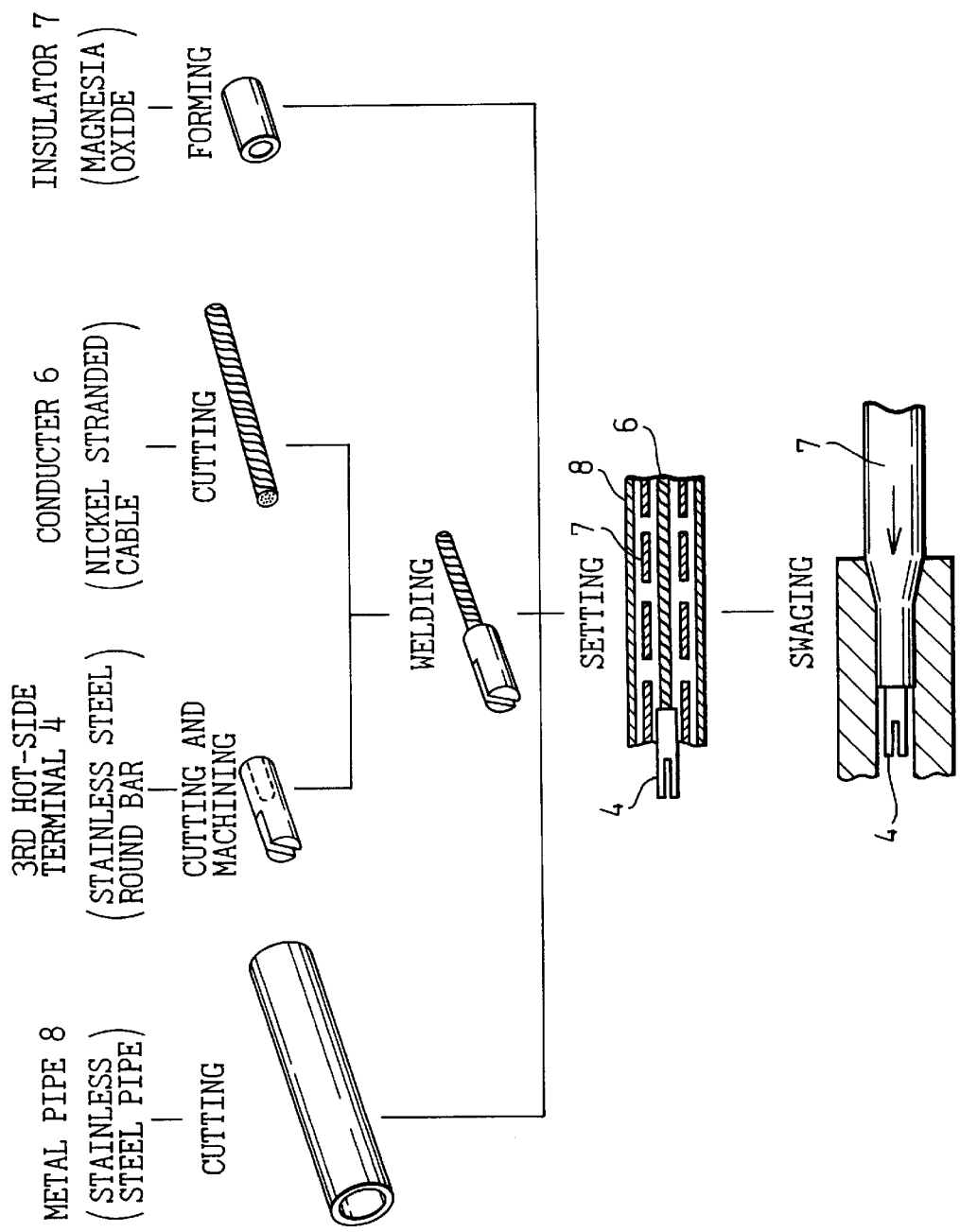

ELECTRODE STRUCTURE FOR HIGH TEMPERATURE HEATED BODY

BACKGROUND OF THE INVENTION

1. Field of the Invention

This invention relates to an electrode for connecting an electric wire to a heated body which is heated to a high temperature. More specifically, this invention relates to an electrode structure of an electrically heated-type catalyst device.

2. Description of the Related Art

An electrically heated-type catalyst device which is heated by electricity to quickly activate a catalyst after the start from a cold state is disclosed, for example, in Japanese Unexamined Patent Publication (Kokai) No. 6-108831. According to the device, one end of a solid stud bolt is connected to a catalyst while the other end is extended to the outside of an exhaust pipe and is connected to an external wire. Generally, a copper cable (copper wire) is used in most cases as the external electric wire.

However, because the junction between the stud bolt and the external electric wire exists in the proximity of the catalyst, the junction is likely to be heated by the catalyst through the stud bolt and attains a high temperature, or the junction on the stud bolt side is likely to undergo high temperature oxidation and invites conduction failure. Further, the external electric wire, too, attains a high temperature, so that problems such as the material change of the electric wire itself or deterioration of a covering material occur.

These problems may be solved, in principle, by extending the length of the lead-out electrode so as to bring the junction away from the catalyst. But according to this arrangement, the resistance value of the lead-out electrode itself becomes so great that the catalyst itself cannot be heated sufficiently or the weight of the lead-out electrode becomes great. In addition, such a large lead-out electrode is more likely to interfere with other components and its mountability is poor.

In view of the problems described above, the present invention aims at lowering the temperature at the junction between the lead-out electrode of the electrically heated-type catalyst device and the external electric wire without increasing the resistance value.

According to the present invention, there is provided a structure of an electrode for connecting an external electric wire to a heated body heated to a high temperature, which comprises a high temperature side electrode made of a conductor and connected to the heated body; and a low temperature side electrode connected at a first end thereof to the high temperature side electrode and having a second end portion thereof connected to the external electric wire; wherein the low temperature side electrode is produced by covering a material changes and conduction defects develop in the prior art devices. However, in the present invention, because the conductor of the low temperature side electrode is made of a material having a lower conduction resistivity than that of the conductor of the high temperature side electrode.

The present invention may be more fully understood from the description of preferred embodiments thereof set forth below, together with the accompanying drawings.

BRIEF DESCRIPTION OF THE DRAWINGS

FIG. 3 is an explanatory view useful for explaining a part of the production process of the electrode according to the present invention.

DESCRIPTION OF THE PREFERRED EMBODIMENTS

Figure 1:
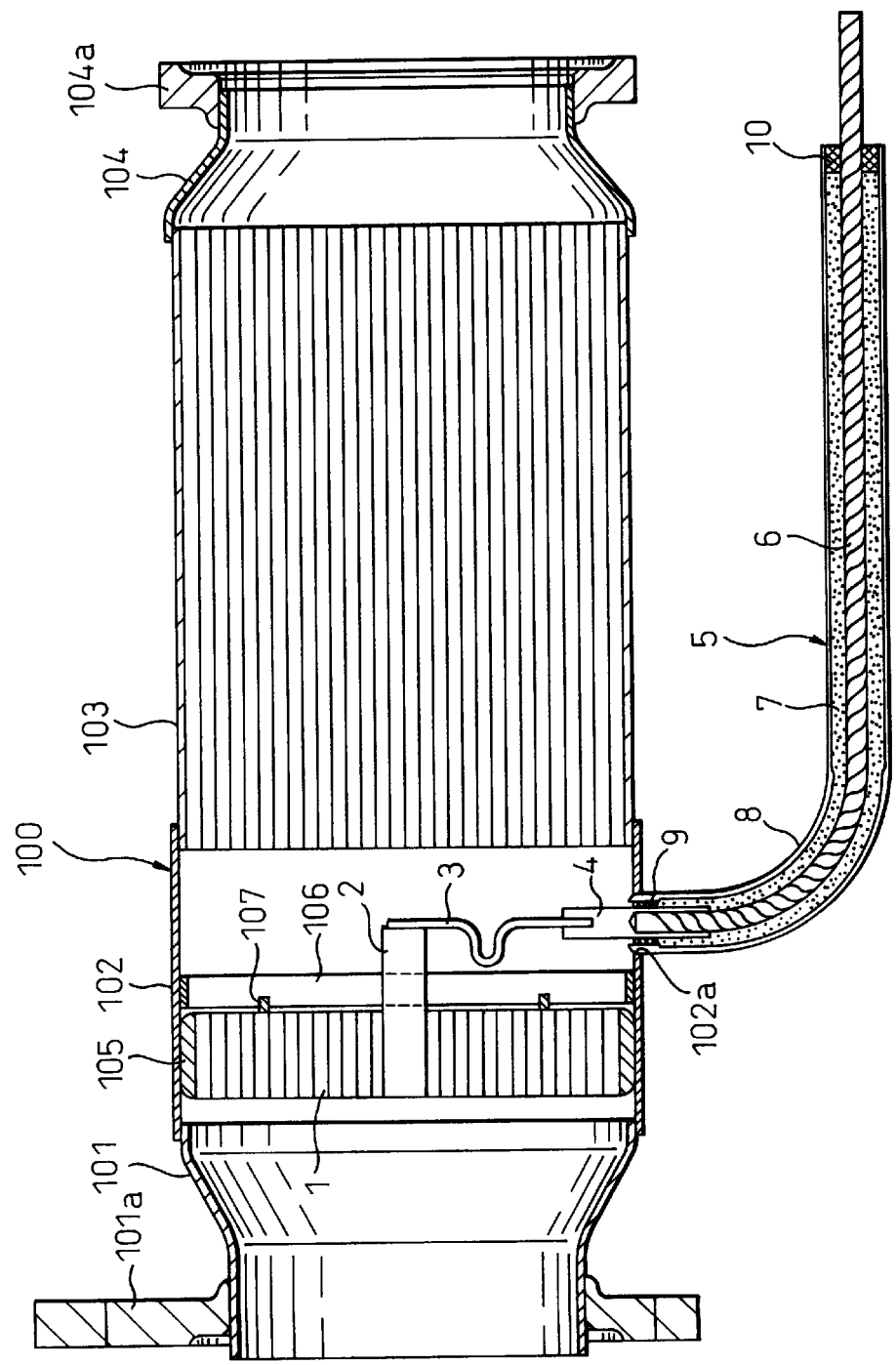
FIG. 1 is a sectional view of an electrically heated-type catalyst equipped with an electrode according to the present invention.

FIG. 1 is a sectional view of a catalyst device interposed into an intermediate part of an exhaust pipe of a car. Reference numeral 100 denotes a catalyst container as a whole. This catalyst container 100 comprises a catalyst container first portion 101, a container second portion 102, a container third portion 103 and a container fourth portion 104 that are coupled by welding.

A flange 101a is fitted to the outside of the catalyst container first portion 101 so as to connect an upstream side exhaust pipe (not shown), and a flange 104a is fitted to the outside of the container fourth portion 104 so as to connect a downstream side exhaust pipe (not shown).

An electrically heated-type catalyst 1 to be electrically heated is disposed inside the catalyst container second portion 102. The electrically heated catalyst 1 includes a support made of a metal and is held in place by a buffer material 105 made of a conductive material, which flexibly supports the catalyst in a circumferential direction, a stopper 107 made of an insulating material, which prevents the catalyst from being moved in the downstream direction by gas pressure, and a holding member 106 which hold this stopper 107.

A solid, rod-like first high temperature side electrode 2 made of a heat-resistant metal such as a stainless steel is fitted to the center portion of the electrically heated catalyst 1, and a sheet-like second high temperature side electrode 3 extending toward the outer peripheral side is fitted to the end portion of the first high temperature side electrode 2 on its downstream side. This second high temperature side electrode 3 is bent into the shape as shown in FIG. 1 so that it can absorb shrinkage due to temperature changes. A third high temperature side electrode 4 is fitted to the other end of the second high temperature side electrode 3, and extends outside through an opening 102a bored in the catalyst container second portion 102.

On the other hand, a conductor 6 made of a conductive material is disposed at a center portion, and a low temperature side electrode 5 covered with a metal pipe 8 through an insulating material 7 made of MgO (magnesium oxide) is welded round the opening 102a formed in the catalyst container second portion 102 through its metal pipe 8.

The outer distal end portion of the third high temperature side electrode 4 is caulked or welded to the distal end portion of the conductor 6 of the low temperature side electrode 5 on the side of the catalyst container 100.

A scatter preventive member 9 is packed to the distal end portion of the low temperature side electrode 5 on the side of the catalyst container 100 so as to prevent the insulating material 7 from breaking and scattering into the catalyst container 100, and the distal end portion of the metal pipe 8 is deformed lest this scatter preventive member 9 falls off into the catalyst container 100.

The external electric wire (not shown) is connected to the other end portion of the conductor 6 of the low temperature side electrode 5. Therefore, the low temperature side electrode 5 has a sufficient length lest the temperature of the connection portion becomes too high. For this reason, the conductor 6 of the low temperature side electrode 5 comprises a twisted wire made of a material having a small conduction resistance such as Ni (nickel), whereas the third high temperature side electrode 4 is made of a stainless steel having a high conduction resistance.

The distal end portion of the metal pipe 8 is deformed lest the scatter preventive member 10 packed into it falls off, in the same way as the distal end portion of the catalyst container 100, but this arrangement is not necessary if the insulating material 7 at this portion is not broken and scatters.

If the low temperature side electrode 5 which is thus elongated is perpendicularly extended with respect to the outer surface of the catalyst container second portion 102, the second portion 102 is more likely to interfere with other components and mountability drops. Therefore, the low temperature side electrode 5 is folded and bent in such a manner as to extend along the catalyst container 100 as shown in the drawing.

The thickness of the curved portion of the metal pipe 8 is greater than that of its straight line portion so as to avoid the occurrence of local cracking and drop in the thickness at the time of bending and folding work.

The thickness of the weld portion of the metal pipe 8 to the periphery of the opening 102a formed in the catalyst container second portion 102 is further greater than the thickness of its curved portion so as to prevent deformation and to improve durability because the low temperature side electrode 5 is supported as a whole by this weld portion.

Therefore, when the thickness of the weld portion is t1, the thickness of the curved portion is t2 and the thickness of the portion closer to the external electrode than the curved portion is t3, the relation t1>t2>t3 is satisfied.

Figure 2:
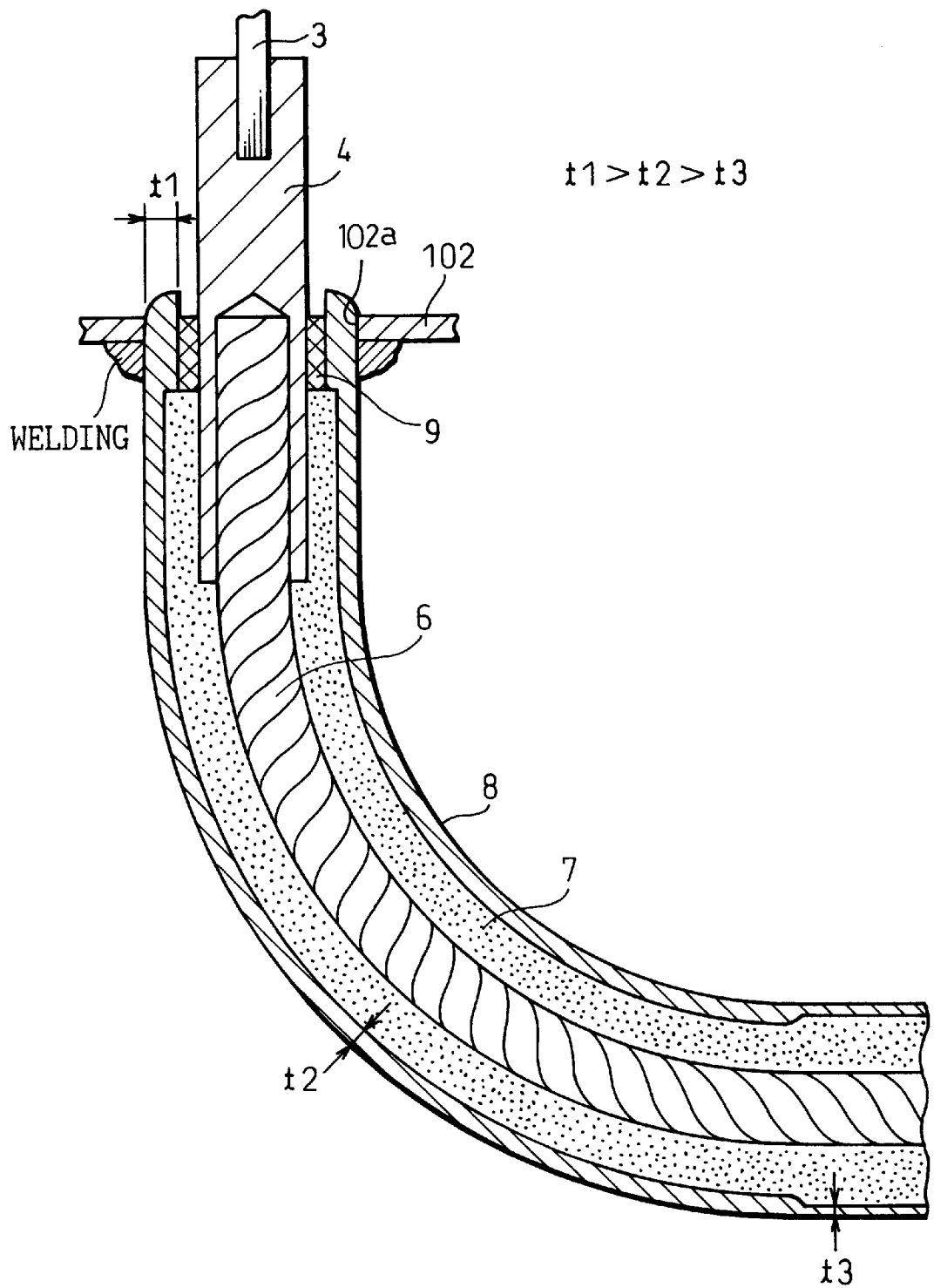
FIG. 2 is a partial enlarged view of FIG. 1.

FIG. 2 is a partial enlarged view of FIG. 1 so that the difference of the thickness can be more easily understood.

Since the low temperature side electrode 5 is made of a material having a smaller conduction resistance than the third high temperature side electrode 4 as described above, the length of the low temperature side electrode 5 is increased so that the temperature at the connection portion with the external electric wire can be sufficiently lowered without increasing conduction resistance. Therefore, the present invention is free from the problems of the prior art, i.e., as the temperature of the external electric wire at the connection portion rises, material changes and conduction defects develop in the prior art devices. However, in the present invention, because the temperature at the connection portion of the external electric wire can be sufficiently lowered, an ordinary electric wire such as a vinyl-coated copper wire can be used for the external electric wire.

When extended, the low temperature side electrode 5 is so bent and folded as to extend along the catalyst container 100 and is less likely to interfere with other components. Therefore, mountability is not deteriorated.

The electrode having the construction described above is produced by the following production steps.

(1) The second high temperature electrode 3, the third high temperature side electrode 4, the center conductor 6 of the low temperature side electrode 5 and the metal pipe 8 are cut and shaped in advance into predetermined shapes and sizes, and the insulating material 7 is shaped into a cylindrical shape having an inner diameter a little greater than the outer diameter of the center conductor 6 and a predetermined length smaller than the length of the center conductor 6.

(2) On the other hand, the electric heating catalyst 1 provided with the first high temperature side electrode 2 at the center thereof is fitted to the catalyst container second portion 102 having the opening 102a formed therein by the buffer material 105, the retaining member 106 and the stopper 107.

(3) The second high temperature side electrode 2 is fitted to the third high temperature side electrode 4 by caulking or welding.

(4) The third high temperature side electrode 4 having the second high temperature side electrode 2 fitted thereto is then fitted to the conductor 6 by caulking or welding.

(5) The assembly after step (4) is inserted into the insulating material 7 which is shaped in advance.

(6) The insulating material 7 having the conductor 6 fitted thereto by step (5) is fitted into the metal pipe 8.

(7) The scatter preventive material 9 is packed into both end portions of the metal pipe 8.

(8) The assembly after step (7) is subjected to diameter reduction machining by a swaging machine.

(9) The assembly after step (8) is bent into a predetermined shape.

(10) The assembly after step (9) is fitted round the opening 102a of the catalyst container second portion 102 prepared in advance by step (2) by welding.

(11) The first high temperature side electrode 2 and the second high temperature side electrode 3 are coupled by welding.

(12) The catalyst container first portion 101 and the catalyst container third portion 103 having the catalyst container fourth portion 104 fitted thereto in advance are coupled to the upstream and downstream sides of the catalyst container second portion 102, respectively, by welding.

FIG. 3 shows the production steps (1) to (8) among the steps described above. As shown in FIG. 3, the insulating material 7 under the material component state before machining is not a unitary product but is a plurality of components cut into a suitable length.

When the electrode is produced as described above, particularly when the conductor of the low temperature side conductor is disposed in the insulating material, the positioning work is not necessary, but it can be positioned accurately and within a short time without requiring skill.

As described above, the present invention can lower the temperature of the junction of the external electric wire connected to the heated body which is heated to a high temperature, without increasing the conduction resistance.

We claim:

1. An electrode structure for connecting an external electric wire to an electrically heated catalyst located in an exhaust pipe, the electrically heated catalyst being heated to a high temperature, the electrode structure comprising:

a high temperature side electrode including a first conductor formed of a first material, wherein a first end of the high temperature side electrode is connected to the heated catalyst; and a low temperature side electrode located outside of the exhaust pipe, a first end of the low temperature side electrode being connected to a second end of the high temperature side electrode and a second end of the low temperature side electrode being connected to the external electric wire, and wherein the low temperature side electrode includes a second conductor formed of a second material, the second conductor being surrounded by an insulating material received within a covering material, the second material having a smaller electrical conduction resistance than the first material.

2. An electrode structure according to claim 1, wherein the heated body is a catalyst disposed inside an exhaust passage of an internal combustion engine, the high temperature side electrode is connected to the catalyst and is disposed inside the exhaust passage, and the low temperature side electrode is disposed outside the exhaust passage.

3. An electrode structure according to claim 2, wherein the low temperature side electrode extends to a junction with the external electric wire along an outer wall of the exhaust passage through a curved portion, and wherein a thickness of the covering material at the curved portion is greater than a thickness of the covering material at a portion of the low temperature side electrode extending along the outer wall.

4. An electrode structure according to claim 2, wherein the low temperature side electrode is supported as a whole when a weld portion of the covering material of the low temperature side electrode is welded to an outer wall of the exhaust passage, and wherein a thickness of the covering material at the weld portion is greater than a thickness of the covering material at other portions thereof.

5. An electrode structure according to claim 2, wherein the high temperature side electrode comprises a first high temperature side electrode, a second high temperature side electrode and a third high temperature side electrode, wherein the first high temperature side electrode is directly connected at a first end thereof to the catalyst and at a second end thereof to a first end of the second high temperature side electrode;

the second high temperature side electrode is shaped to absorb thermal contraction, wherein a second end of the second high temperature side electrode is connected to a first end of the third high temperature electrode; and the third high temperature electrode penetrates a wall of a catalyst container forming a part of the exhaust passage, and wherein a second end of the third high temperature side electrode is connected to the first end of the low temperature side electrode.

6. An electrode structure according to claim 5, wherein the third high temperature side electrode and the low temperature side electrode are connected by caulking.

7. An electrode structure according to claim 5, wherein the third high temperature side electrode and the low temperature side electrode are connected by welding.

8. An electrode structure according to claim 1, wherein the high temperature side electrode is made of a stainless steel.

9. An electrode structure according to claim 1, wherein the second conductor is made of a twisted wire of nickel.

10. An electrode structure according to claim 1, wherein the insulating material of the low temperature side electrode is magnesium oxide.

11. An electrode structure according to claim 1, wherein the covering material of the low temperature side electrode is a pipe made of a metal.

12. An electrode structure according to claim 1, wherein the low temperature side electrode is produced by fitting the second conductor into the insulating material which has been shaped in advance into a hollow tubular shape, and then inserting the resulting assembly into the covering material which has been shaped in advance into a hollow tubular shape and then subjecting the resulting assembly to integral reduction rolling by swaging.

\* \* \* \* \*